(12) United States Patent
Mihara (10) Patent No.: US 9,492,765 B2
(45) Date of Patent: Nov. 15, 2016

(54) VALVE UNIT

(71) Applicant: PIOLAX, Inc., Yokohama-shi (JP)

(72) Inventor: Kenta Mihara, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 79 days.

(21) Appl. No.: 14/356,570

(22) PCT Filed: Nov. 1, 2012

(86) PCT No.: PCT/JP2012/078309
§ 371 (c)(1),
(2) Date: May 6, 2014

(87) PCT Pub. No.: WO2013/069532
PCT Pub. Date: May 16, 2013

(65) Prior Publication Data
US 2014/0305514 A1    Oct. 16, 2014

(30) Foreign Application Priority Data
Nov. 8, 2011  (JP) ................................ 2011-244861

(51) Int. Cl.
*F16K 24/04*    (2006.01)
*B01D 19/00*    (2006.01)
(Continued)

(52) U.S. Cl.
CPC ..... *B01D 19/0063* (2013.01); *B60K 15/03519* (2013.01); *F02M 37/20* (2013.01);
(Continued)

(58) Field of Classification Search
CPC .......... Y10T 137/053; Y10T 37/0874; Y10T 37/3099; Y10T 37/6004; Y10T 37/0777; Y10T 137/7358; Y10T 137/86324; Y10T 137/86332; Y10T 137/8634; F02M 37/00; F02M 37/0082; F02M 37/20; F16K 17/196; F16K 24/00; F16K 27/02; F16K 24/044; F16K 24/06; B60K 2015/03289; B60K 2015/03388; B60K 15/03519; B01D 19/0063
USPC ...................... 137/15.26, 39, 43, 202, 315.08
See application file for complete search history.

(56) References Cited

U.S. PATENT DOCUMENTS 1,637,076 A * 7/1927 Heil ...................... F16K 17/194
                                                                   137/43
4,756,328 A * 7/1988 Sherwood ........ B60K 15/03519
                                                                   137/39
(Continued)

FOREIGN PATENT DOCUMENTS

CN        1730994 A    2/2006
CN      101487539 A    7/2009
(Continued)

OTHER PUBLICATIONS

International Search Report in PCT/JP2012/078309 dated Jan. 22, 2013. (English Translation Thereof).
(Continued)

*Primary Examiner* — Craig J Price
(74) *Attorney, Agent, or Firm* — McGinn IP Law Group, PLLC (57) ABSTRACT

A valve unit includes a housing which has a partition wall in which an opening portion is formed, a float valve which is disposed within a valve chamber R1 thereof, and a check valve which is disposed within a valve chamber R2. A valve seat is provided on a lower surface side of the partition wall, and plural radially-extending thin ribs are formed therearound. Plural axially-extending check valve guide ribs are provided at predetermined circumferential intervals with in the vent chamber R2, and plural axially-extending float valve guide ribs are provided at predetermined circumferential intervals within the valve chamber R1. The thin ribs and the check valve guide ribs are formed circumferentially alternately so as not to be superposed on each other when viewed from an axial direction of the housing.

8 Claims, 6 Drawing Sheets

(51) Int. Cl.
*F16K 17/196* (2006.01)
*B60K 15/035* (2006.01)
*F16K 24/06* (2006.01)
*F02M 37/20* (2006.01)
*B60K 15/03* (2006.01)
*F02M 37/00* (2006.01)

(52) U.S. Cl.
CPC .......... *F16K 17/196* (2013.01); *F16K 24/044* (2013.01); *F16K 24/06* (2013.01); *B60K 2015/03289* (2013.01); *B60K 2015/03388* (2013.01); *F02M 37/0082* (2013.01); *Y10T 137/0874* (2015.04); *Y10T 137/3099* (2015.04)

(56) References Cited

U.S. PATENT DOCUMENTS

| | | | |
|---|---|---|---|
| 5,522,417 A * | 6/1996 | Tomioka | B60K 15/03519 137/202 |
| 5,992,441 A * | 11/1999 | Enge | B60K 15/03519 137/202 |
| 7,219,683 B2 | 5/2007 | Furuya et al. | |
| 7,243,639 B2 * | 7/2007 | Ueki | F16K 24/044 123/516 |
| 2005/0092364 A1 * | 5/2005 | Furuya | F16K 17/196 137/202 |
| 2007/0006919 A1 * | 1/2007 | Tagami | F16K 24/044 137/202 |
| 2007/0125427 A1 * | 6/2007 | Kaneko | F16K 24/044 137/202 |
| 2011/0017320 A1 * | 1/2011 | Kito | F16K 24/044 137/423 |
| 2011/0226356 A1 | 9/2011 | Yamaguchi | |

FOREIGN PATENT DOCUMENTS

| | | |
|---|---|---|
| CN | 201973309 U | 9/2011 |
| JP | 1976-098833 A | 8/1976 |
| JP | 1994-040539 A | 5/1994 |
| JP | 2001-323854 A | 11/2001 |
| JP | 2005-133875 A | 5/2005 |
| JP | 4026322 B2 | 12/2007 |
| JP | 2009-079753 A | 4/2009 |
| JP | 2009-168133 A | 7/2009 |
| JP | 4335877 B2 | 9/2009 |
| WO | WO 2010/064475 A1 | 6/2010 |

OTHER PUBLICATIONS

Chinese Office Action dated Mar. 24, 2015 with an English translation thereof.

Japanese Office Action dated Aug. 18, 2015 with English translation.

* cited by examiner

FIG. 6

VALVE UNIT

TECHNICAL FIELD

The present invention relates to a valve unit which is mounted in a fuel tank of a motor vehicle or the like for use as a cut valve or a fuel tank overfilling restriction valve.

BACKGROUND ART

For example, a cut valve and a fuel tank overfilling restriction valve are mounted in a fuel tank of a motor vehicle. The cut valve prevents fuel in the fuel tank from leaking to the outside thereof when the motor vehicle turns or is inclined. The fuel tank overfilling restriction valve stops the filling of fuel into the fuel tank at an upper limit value for a specified filling capacity of the fuel tank when fuelling the fuel tank.

For example, Patent Document 1 describes a check valve integrated cut valve which has: a main body case formed of a circumferential wall and an upper wall for accommodation of a float valve; a circular vent hole formed in a central portion of the upper wall; a cylindrical portion elected from the upper wall of the main body case at the outer circumference of the vent hole; a cap member securely fitted over an upper opening portion in the cylindrical portion; a positive pressure valve disposed above the vent hole so as to contact therewith and go apart therefrom; and a negative pressure valve disposed so as to contact with and go apart from an opening portion in the positive pressure valve. A lower circumferential edge of the vent hole formed in the upper wall forms a valve seat, so that an upwardly-projecting centrally-located valve head of the valve float is allowed to contact with and go apart from the valve seat. Further, axially-extending guide ribs are formed at even circumferential intervals on an inner circumference of the cylindrical portion that is erected from the outer circumference of the vent hole so as to guide the upward/downward movement of the positive pressure valve.

When the fuel level in the fuel tank raises as a result of the vehicle oscillating or turning to submerge the float valve, the float valve is caused to float, and the valve head thereof abuts an inner circumference of the valve seat to close the vent hole, thereby preventing the fuel from leaking to the outside of the fuel tank. In addition, when the pressure inside the fuel tank is increased, the positive pressure valve raises to move apart from the vent hole, and fuel vapors within the fuel tank are discharged therefrom. On the other hand, when the pressure inside the fuel tank is reduced, the negative pressure valve is pushed down by the atmospheric pressure to move apart from the opening portion of the positive pressure valve, and outside air is introduced into the fuel tank through the opening portion and the vent hole, thereby adjusting the pressure inside the fuel tank.

PRIOR ART DOCUMENT

Patent Document

Patent Document 1
JP-2005-133875-A

SUMMARY OF THE INVENTION

Problem that the Invention is to Solve

The main body case of the check valve integrated cut valve is formed through injection molding. Since the plural guide ribs project from the outer circumference of the vent hole in the center of the upper wall on the inner circumference of the cylindrical portion, shrink marks are generated by these guide ribs. It is found that the shrink marks so generated act on the wall of the outer circumference of the vent hole to deteriorate the roundness of the vent hole, thereby deteriorating the sealing performance of the float valve.

An object of the invention is to provide a valve unit which can enhance the sealing performance of a float valve when the valve is closed by improving the roundness of an opening portion formed in a partition wall.

Means for Solving the Problem

With a view to achieving the object above, the invention provides
a valve unit including:
a housing in which a lower valve chamber communicating with an interior of a fuel tank and an upper vent chamber communicating with an outside of the fuel tank are provided via a partition wall, the partition wall having an opening portion;
a float valve which is disposed in the valve chamber of the housing so as to move upwards/downwards; and
a check valve which is disposed within the vent chamber so as to move upwards/downwards,
wherein a valve seat is provided along a circumferential edge of the opening portion on a lower surface side of the partition wall, and plural radially-extending thin ribs are formed around the valve seat,
wherein check valve guide ribs which guide an upward/downward movement of the check valve extend axially while being connected to the partition wall and are provided at predetermined circumferential intervals on an inner circumference of the vent chamber, and
wherein the thin ribs which are formed on a lower surface of the partition wall and the check valve guide ribs which are formed on the inner circumference of the vent chamber are formed circumferentially alternately so as not to be superposed on each other when viewed from an axial direction of the housing.

The invention may provide the valve unit,
wherein the thin ribs are discontinued from the valve seat so as not reach thereto to thereby form a non-rib portion between the thin ribs and the valve seat.

The invention may provide the valve unit,
wherein gate portions that are used in injection molding the housing are disposed on an upper surface side of the partition wall at plural positions which coincide with the thin ribs.

The invention may provide the valve unit,
wherein axially-extending float valve guide ribs which guide an upward/downward movement of the float valve are provided at predetermined circumferential intervals on an upper portion of an inner circumference of the valve chamber, and upper end portions of the float valve guide ribs are connected to outer circumferential end portions of the thin ribs.

Advantage of the Invention

According to the invention, since the check valve guide ribs and the thin ribs are formed alternately along the circumferential direction so as not to be superposed on each other when viewed from the axial direction of the housing, shrink marks that are produced on an outer circumference of the opening portion when cooled after the injection molding of the housing can be dispersed evenly not only on the upper and lower surface sides of the partition wall but also along the circumferential direction of the partition wall, thereby improving the roundness of the opening portion. This can enhance the sealing performance of the float valve when the valve is closed.

BRIEF DESCRIPTION OF DRAWINGS

FIGS. 4A and 4B show a housing main body which makes up the valve unit.

MODE FOR CARRYING OUT THE INVENTION

Hereinafter, referring to FIGS. 1 to 6, an embodiment of a valve unit of the invention will be described.

Figure 1:
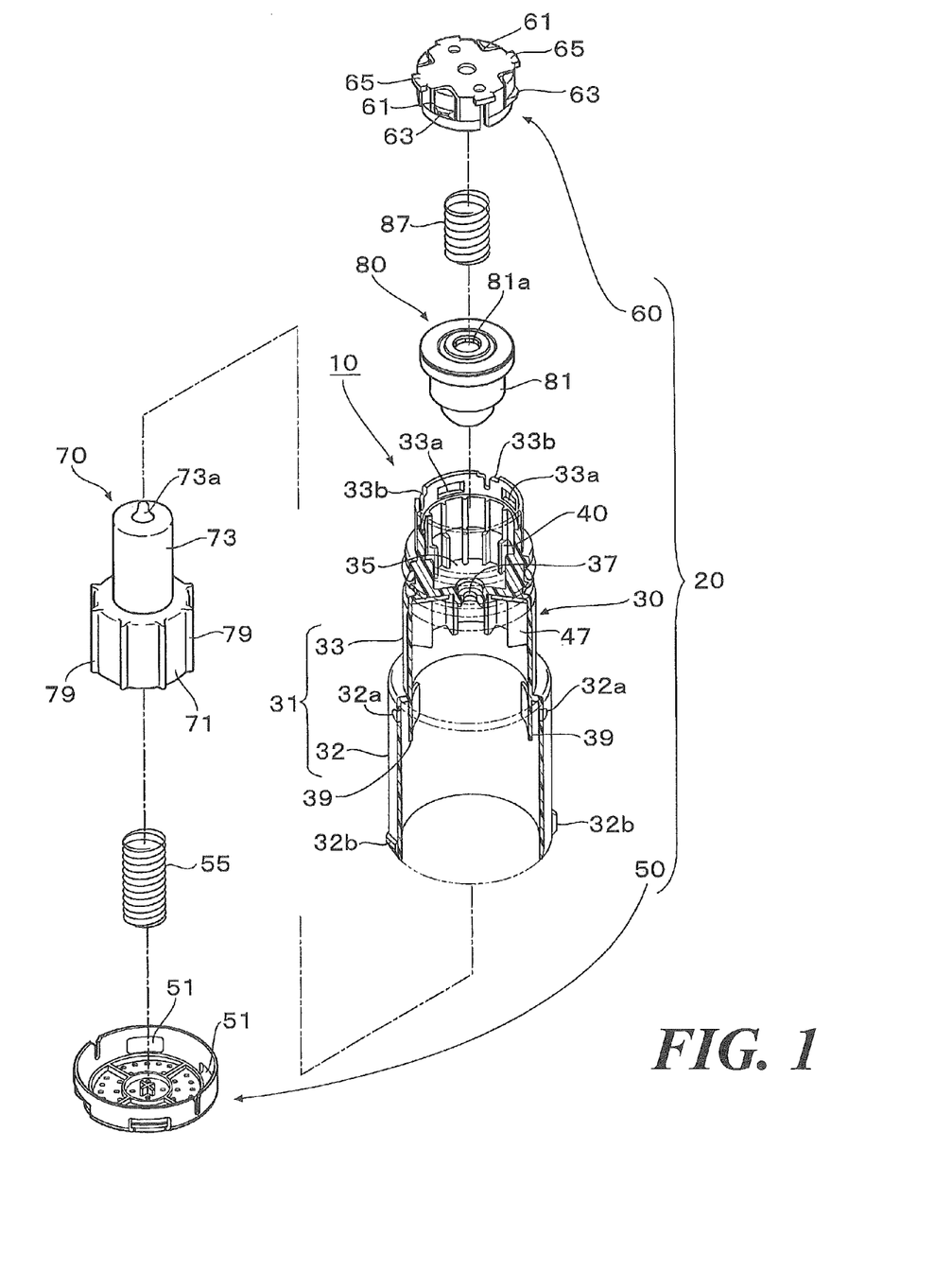
FIG. 1 is an exploded perspective view which shows an embodiment of a valve unit according to the invention.
Figure 2:
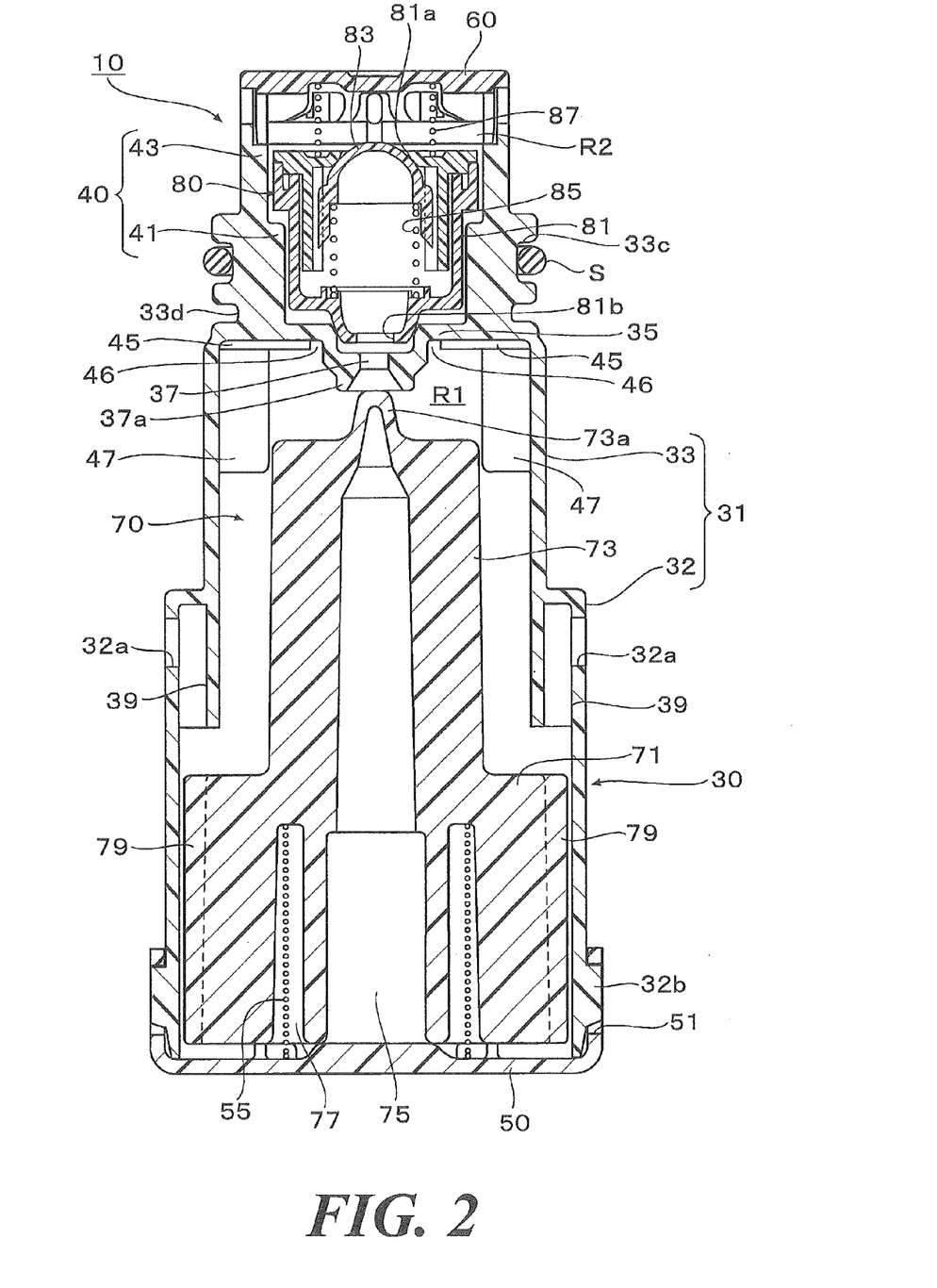
FIG. 2 is a sectional view of the valve unit.

As shown in FIGS. 1 and 2, the valve unit 10 has a housing 20 in which a lower valve chamber R1 and an upper vent chamber R2 are formed via a partition wall 35. A float valve 70 is disposed within the valve chamber R1 of the housing 20 so as to move upwards/downwards, and a check valve 80 is disposed within the vent chamber R2 of the housing 20 so as to move upwards/downwards.

As shown in FIG. 1, the housing 20 of this embodiment includes a substantially cylindrical housing main body 30, a lower cap 50 attached to a lower opening portion of the housing main body 30, and an upper cap 60 which is attached to an upper opening portion of the housing main body 30. The valve chamber R1 which communicates with the interior of the fuel tank is defined by the housing main body 30 and the lower cap 50, and the vent chamber R2 which communicates with the outside of the fuel tank is defined by the housing main body 30 and the upper cap 60 (refer to FIG. 2).

The housing main body 30 has a circumferential wall 31 which is made up of a substantially cylindrical lower cylindrical portion 32 and substantially cylindrical upper cylindrical portion 33 provided continuously from an upper portion of the lower cylindrical portion 32. The lower cylindrical portion 32 is diametrically expanded to a predetermined diameter, and the upper cylindrical portion 33 is diametrically contracted than the lower cylindrical portion 32. The partition wall 35 is provided in a predetermined position of the upper cylindrical portion 33 of the circumferential wall 31. A portion of the upper cylindrical portion 33 which lies further upwards than the partition wall 35 is further slightly contracted. A circular opening portion 37 is formed in a center of the partition wall 35, whereby the valve chamber R1 and the vent chamber R2 communicate with each other.

Plural engagement holes 33a are formed along a circumferential edge of an upper opening portion of the upper cylindrical portion 33 of the circumferential wall 31, and plural engagement recesses 33b are formed along an upper end portion of the upper cylindrical portion 33. As shown in FIG. 2, an annular seal ring mounting recess 33c for mounting a seal ring S is formed in an axial halfway position of the upper cylindrical portion 33. An annular lightning recess 33d is formed below the seal ring mounting recess 33c.

On the other hand, plural through holes 32a which communicate with the valve chamber R1 are formed in predetermined positions on the lower cylindrical portion 32 of the circumferential wall 31. From a lower end of the upper cylindrical portion 33 of the circumferential wall 31, fuel-splashing prevention walls 39 extend downward so as to each face the lower cylindrical portion 32 with a gap at a position corresponding thereto. These fuel-splashing prevention walls 39 block fuel which flows into the valve chamber R1 from the through holes 32a to thereby prevent the leakage of fuel from the opening portion 37 into the vent chamber R2 before it is closed by the flat valve 70. Plural engagement projections 32b project from an outer circumference of a lower portion of the lower cylindrical portion 32 at predetermined circumferential intervals.

Plural check valve guide ribs 40 which guide the upward/downward movement of the check valve 80 are provided on an upper surface side of the partition wall 35, that is, on an inner circumferential surface of the upper cylindrical portion 33 of the circumferential wall 31 on an inner circumference of the vent chamber R2. As shown in FIGS. 2 to 4B, in this embodiment, the check valve guide ribs 40 extend upwards from an upper surface of the partition wall 35 along an axial direction of the upper cylindrical portion 33 and project at even intervals along a circumferential direction of the upper cylindrical portion 33.

Figure 3:
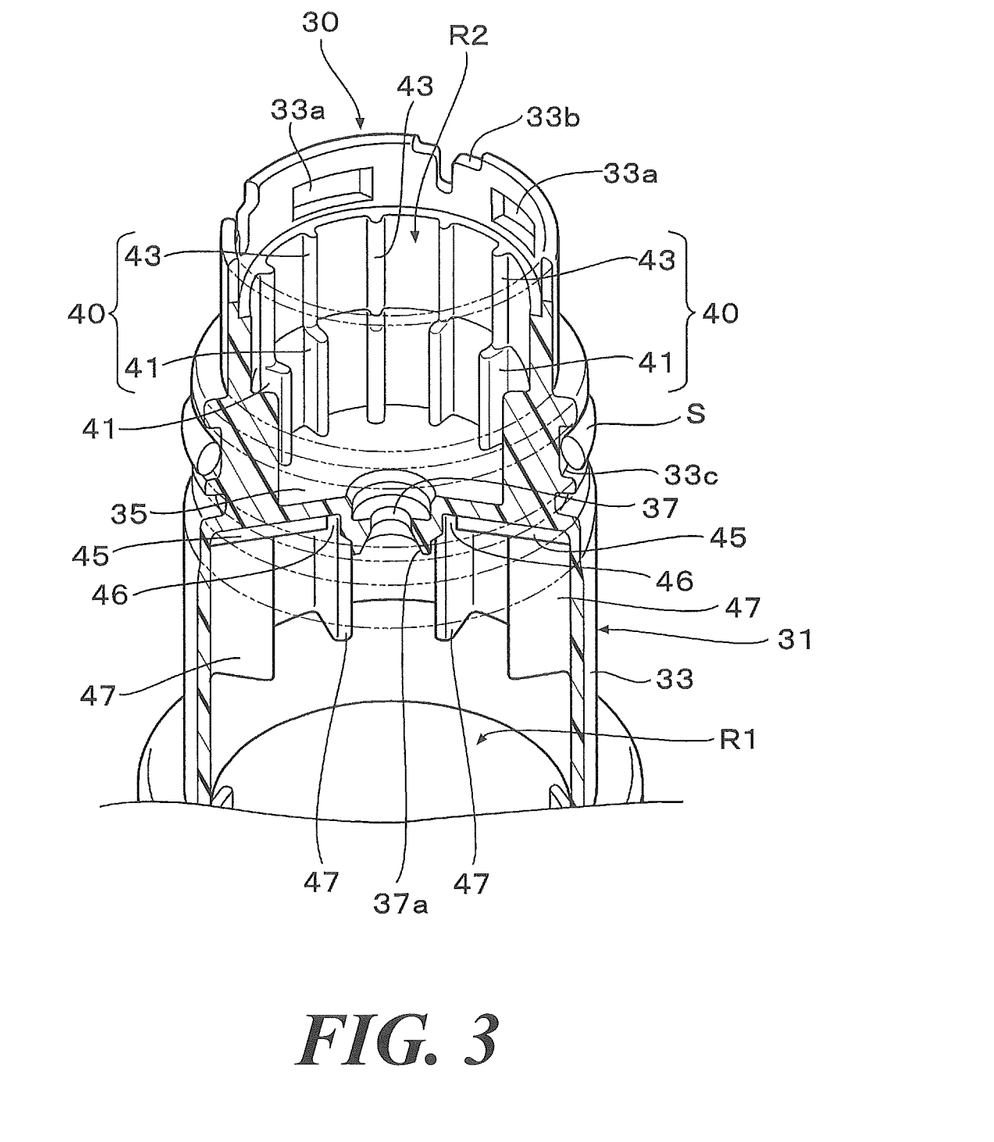
FIG. 3 is an enlarged perspective view of a main part of the valve unit.
Figure 4A:
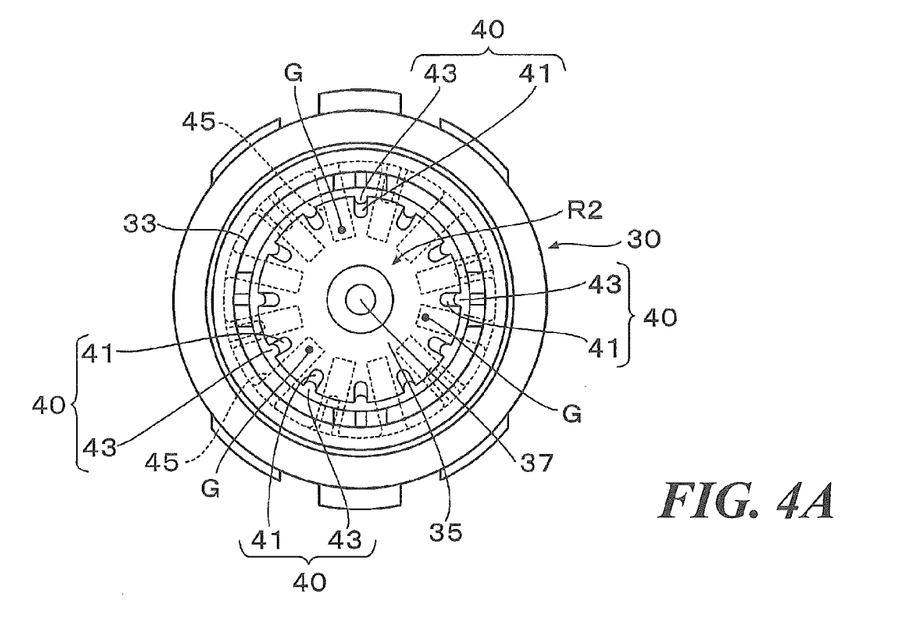
FIG. 4A being a plan view of the valve unit, FIG. 4B being a bottom view thereof.

As shown in FIG. 4A, in each of the check valve guide rib 40, an outer circumferential end portion is connected to the inner circumferential surface of the upper cylindrical portion 33, whereas an inner circumferential end portion projects towards the opening portion 37 in the center of the partition wall. As shown in FIGS. 2 and 3, each check valve guide rib 40 includes a wide lower portion 41 and a narrow upper portion 43 provided continuously with an upper portion of the lower portion 41. The lower portion 41 projects largely radially inwards, and the upper portion 43 is narrower in width than the lower portion 41.

Although 12 check valve guide ribs 40 are provided on the inner circumference of the vent chamber R2 in this embodiment, the number of ribs is not limited thereto as long as the check valve 80 can be guided. As the number of check valve guide ribs 40, it is preferable that 6 to 18 check valve guide ribs 40 are provided. If the number of check valve guide ribs 40 is less than six, the check valve 80 tends to rattle easily, whereas if the number exceeds 18, since the area of a flow path along which fuel vapors flow between an outer circumference of the check valve 80 and an inner circumference of the upper cylindrical portion 33 tends to be insufficient, fuel vapors may become difficult to flow when the pressure within the fuel tank is increased.

Figure 4B:
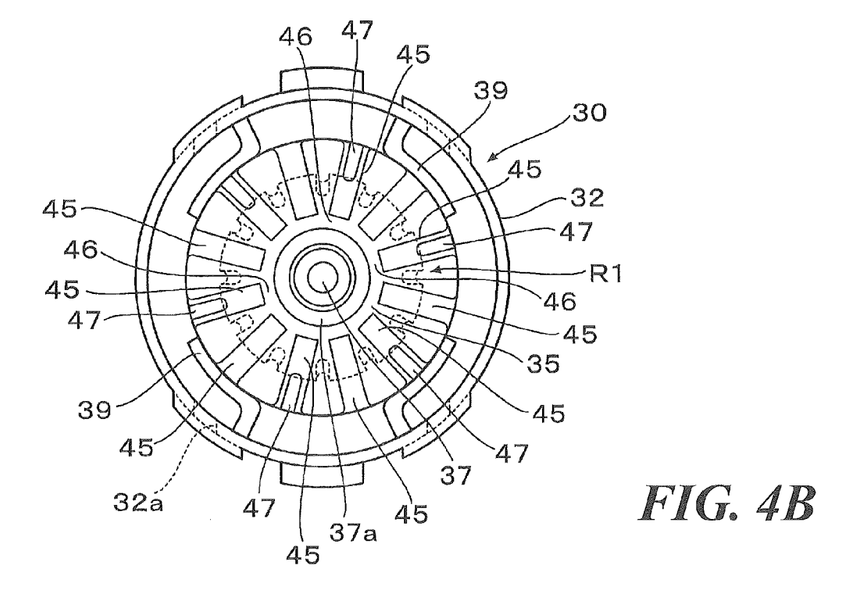

As shown in FIGS. 2, 3 and 4B, a valve seat 37a which is provided along a circumferential edge of the opening portion 37 and plural radially-extending thin ribs 45 are formed on the lower surface side of the partition wall 35. The thin ribs 45 are formed with a predetermined space defined from an outer circumference of the valve seat 37a. As shown in FIG. 4B, when viewed along an axial direction of the housing 30, the thin ribs 45 are disposed between the plural check valve guide ribs 40, 40 on the upper surface side of the partition wall 35 so as not to be superposed thereon. In each thin rib 45, an outer circumferential end portion is connected to the inner circumferential surface of the upper cylindrical portion 33 of the circumferential wall 31, whereas an inner circumferential end portion is discontinued before the valve seat 37a so as not to reach the valve seat 37a, thereby forming a flat non-rib portion 46 between the thin rib 45 and the valve seat 37a.

In this embodiment, since the thin ribs 45 are disposed individually between the check valve guide ribs 40, the same number of thin ribs 45 as that of check valve guide ribs 40, that is, 12 thin ribs 45 are provided around the valve seat 37a. However, the number of thin ribs 45 may not be the same with that of check valve guide ribs 40. Any number of thin ribs 45 may be provided at even circumferential intervals in positions where the thin ribs 45 are not superposed on the check valve guides 40. Although the number of thin ribs 45 is not limited to any specific number, it is preferable that 6 to 18 thin ribs 45 are provided. If the number of thin ribs 45 is less than 6, since the number of cavities C2 (refer to FIG. 6) for thin ribs 45 which forms passageways for molten resin at the time of injection molding is reduced, at the time of injection molding, molten resin may become difficult to sufficiently flow to all cavities in the housing main body 30. On the other hand, if the number of cavities exceeds 18, since the width of the resulting thin ribs 45 becomes narrow and the width of the cavities C2 becomes narrow, at the time of injection molding, molten resin may become difficult to smoothly flow.

As shown in FIGS. 2, 3 and 4B, plural float valve guide ribs 47 which guide the upward/downward movement of the float valve 70 are provided at an upper portion of an inner circumference of the valve chamber R1, that is, on an inner circumference of an upper portion of the upper cylindrical portion 33 of the circumferential wall 31 which lies further downwards than the lower surface side of the partition wall 35. In this embodiment, the individual float valve guide ribs 47 are connected to the lower surface of the partition wall 35 so as to extend a predetermined length downwards along the axial direction of the upper cylindrical portion 33 and so as to project at even intervals along the circumferential direction of the upper cylindrical portion 33. Each float valve guide rib 47 extends such a length that the float valve guide ribs 47 still interferer with an upper portion of the float valve 70 even when the float valve 70 moves downwards (refer to FIG. 2).

As shown in FIG. 4B, while the plural radially-extending thin ribs 45 are disposed at even circumferential intervals outwardly of the opening portion 37, each float valve guide rib 47 is provided per two thin ribs 45 so that the float valve guide rib 47 is superposed on one of the two thin ribs 45 and its upper end portion is connected to the outer circumferential end portion of the corresponding thin rib 45. Each float valve guide rib 47 extends almost half a length of the thin rib 45 at its inner circumferential end portion.

While the six float valve guide ribs 47 are provided with respect to the twelve thin ribs 45 in this embodiment so that each float valve guide rib 47 is superposed on one of the corresponding two thin ribs 45, the number of float valve guide ribs is not limited thereto. However, it is preferable that six to eight float valve guide ribs are provided. If the number of float valve guide ribs 47 is less than six, the float valve 70 tends to rattle. On the other hand, if the number of float valve guide ribs 47 exceeds eight, since a gap between an inner surface of the housing main body 30 and an outer circumference of the float valve 70 becomes small, fuel vapors may not smoothly flow through the gap when the pressure inside the fuel tank is increased, and outside air may not be smoothly introduced through the gap when the pressure inside the fuel tank is reduced.

The lower cap 50 to be attached to the lower opening portion of the above-mentioned housing main body 30 has a bottomed cylindrical shape, and engagement holes 51 are formed in an outer circumferential surface thereof so that the engagement projections 32b on the housing main body 30 engage therewith.

As shown in FIG. 1, the upper cap 60 to be attached to the upper opening portion of the housing main body 30 has a lid-like shape whose upper surface is closed and can flex due to slits 61 formed in a circumferential surface thereof. The upper cap 60 includes engagement claws 63 which engage with the engagement holes 33a in the housing main body 30 and engagement projections 65 which project from an upper end circumferential edge thereof so as to engage with the engagement recesses 33b of the housing main body 30.

As described above, the housing 20 is made up of the housing main body 30, the lower cap 50 and the upper cap 60, and an external case, not shown, is attached to an outer circumference of an upper portion of the housing 20, whereby the valve unit 10 is mounted in a fuel tank, not show, via the external case.

Figure 5:
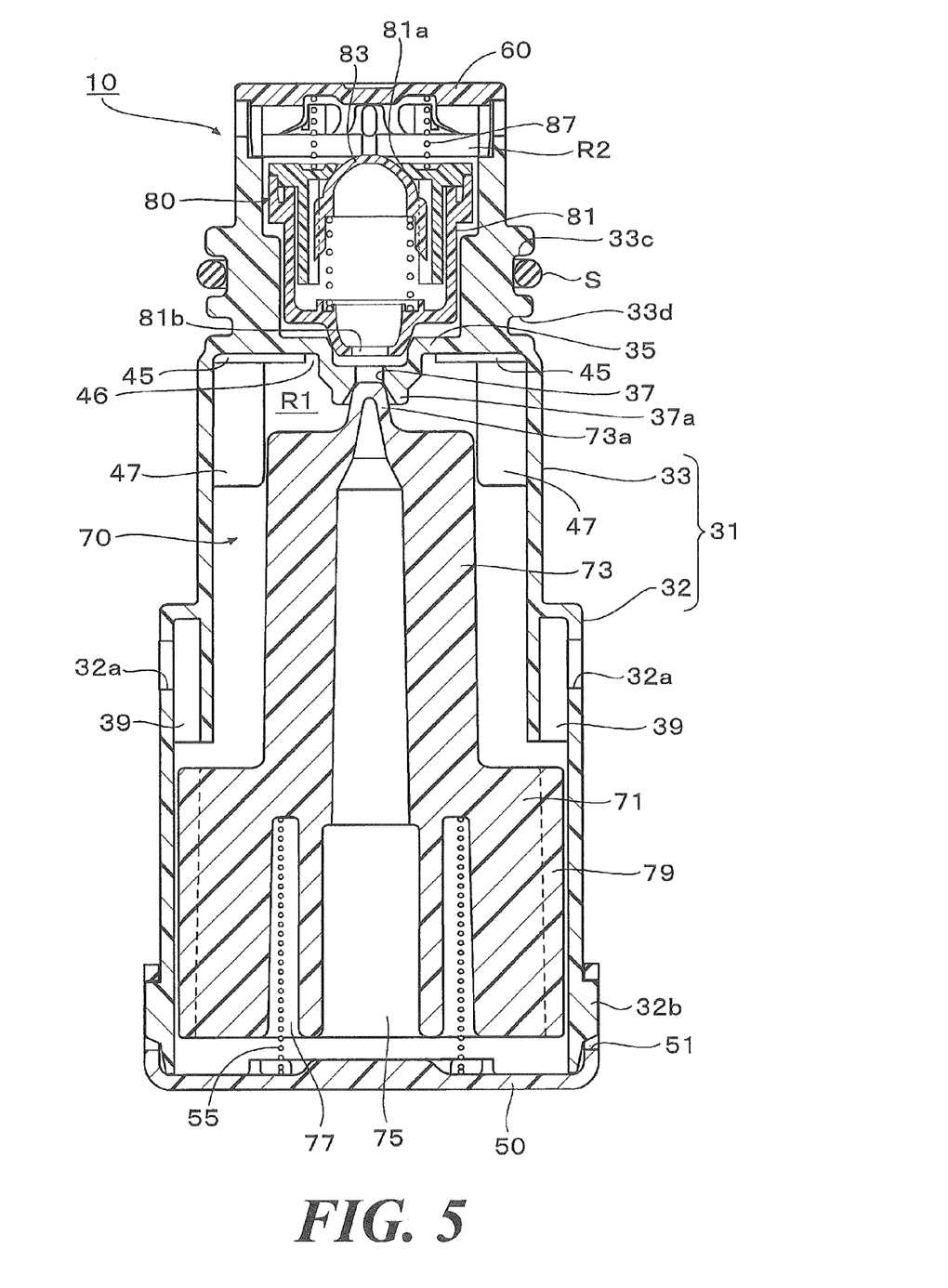
FIG. 5 is a sectional view of the valve unit when a float valve moves upwards.

The float valve 70 is disposed within the valve chamber R1 so as to move upwards/downwards. In this embodiment, the float valve 70 has a base portion 71 which is disposed at a lower portion and an insertable portion 73 which projects upwards from a center of an upper surface of the base portion 71. The insertable portion 73 has an outside diameter smaller than that of the base portion 71. As shown in FIGS. 2 and 5, an upper portion of the insertable portion 73 is inserted into an inner circumference defined by the plural float valve guide ribs 47 so as to guide the upward/downward movement of the float valve 70.

A valve head 73a projects from a center of an upper end of the insertable portion 73. The valve head 73a moves so as to contact with and go apart from the valve seat 37a of the housing main body 30 to thereby close and open the opening portion 37 which is formed in the partition wall 35 (refer to FIGS. 2 and 5). A lightning recess 75 is formed in a center of a lower surface of the float valve 70, and an annular spring accommodation recess 77 is formed around the lightning recess 75. Plural axially-extending ribs 79 are provided at even circumferential intervals on an outer circumference of the base portion 71 of the float valve 70 so as to guide the upward/downward movement of the float valve 70 together with the float valve guide ribs 47. Although eight ribs 79 are provided in this embodiment, there is imposed no specific limitation on the number of ribs 70 and the position where they are formed.

The above-described float valve 70 is accommodated in the valve chamber R1 of the housing main body 30, and the upper portion of the insertable portion 73 is inserted into the inner circumference defined by the plural float valve guide ribs 47. Thereafter, a float valve spring 55 is accommodated in the spring accommodation recess 77 in the float valve 70 with the other end of the spring supported on a top surface of the lower cap 50, and further, an outer circumferential surface of the lower cap 50 is disposed on an outer circumference of the lower opening portion in the housing main body 30 so that the engagement projections 32b of the housing main body 30 engage with the engagement holes 51 in the lower cap 50. As described above, the lower cap 50 is attached to the lower opening portion in the housing main body 30, and the float valve 70 is accommodated within the valve chamber R1 so as to move upwards/downwards (refer to FIGS. 2 and 5).

In a state where the float valve 70 accommodated in the valve chamber R1 is not submerged in fuel, the float valve 70 compresses the float valve spring 55 with its own weight to thereby rest on a bottom portion of the lower cap 50, and the opening portion 37 in the housing main body 30 is held open (refer to FIG. 2). When the level of fuel within the fuel tank rises whereby the float valve 70 is submerged in the fuel to a predetermined height, the float valve 70 is caused to move upwards by a sum of a biasing force of the float valve spring 55 and the buoyancy of the float valve 70 itself, whereby the valve head 73a abuts the valve seat 37a to close the opening portion 37 (refer to FIG. 5).

On the other hand, as shown in FIGS. 1 and 2, the check valve 80 disposed within the vent chamber R2 so as to move upwards/downwards includes mainly a casing 81 having through holes 81a, 81b which are provided in upper and lower surfaces thereof, respectively, a valve element 83 which is disposed within the casing 81 so as to move upwards/downwards to thereby contact with and go apart from the upper through hole 81 a and an incorporated spring 85 which biases the valve element 83 towards the through hole 81a. This check valve 80 is accommodated within the vent chamber R2 of the housing 20 so as to move upwards/downwards to thereby contact with and go apart from an upper circumferential edge of the opening portion 37 on an upper surface of the partition wall 35.

A lower end of a check valve spring 87 abuts an upper surface of the casing 81 of the check valve 80 accommodated within the vent chamber R2, while an upper end of the check valve spring 87 abuts a lower surface of the upper cap 60. The engagement projections 65 of the upper cap 60 engage with the engagement recesses 33b of the housing main body 30, and the engagement claws 63 of the upper cap 60 abut the engagement holes 33a of the housing main body 30, thereby attaching the upper cap 60 to the upper opening portion of the housing 20 in a state where the check valve spring 87 is compressed. As a result, the check valve 80 is biased towards the opening portion 37 of the housing 20 by the check valve spring 87 so that the opening portion 37 is closed in a normal state.

In the above-described valve unit 10 of the embodiment, respective components are injection molded from a synthetic resin. As to the housing main body 30, gate portions G used to injection mold the housing main body 30 are disposed at plural positions on the upper surface side of the partition wall 35 so as to coincide with the thin ribs 45 on the lower surface side of the partition wall 35, and gate marks are formed (refer to FIG. 4A). In this embodiment, as shown in FIG. 4A, while the thin ribs 45 project radially around the opening portion 37 at even intervals, totally three gate portions G are disposed in positions so as to each lie in every three of the thin ribs 45. Each gate portion G coincides with the inner circumferential end portion of the corresponding thin rib 45.

The gate portions G represent the positions of gates used in injection molding, and in this embodiment, a resin is injected from the three gate portions G disposed at even circumferential intervals around the valve seat 37a. However, there is imposed no specific limitation on the number of gates (the number of gate portions G), and hence, two or four gates (gate portions G) may be provided as long as the gates are disposed at even circumferential intervals around the valve seat 37a and in the positions which are superposed on the thin ribs 45 when viewed from the axial direction.

Figure 6:
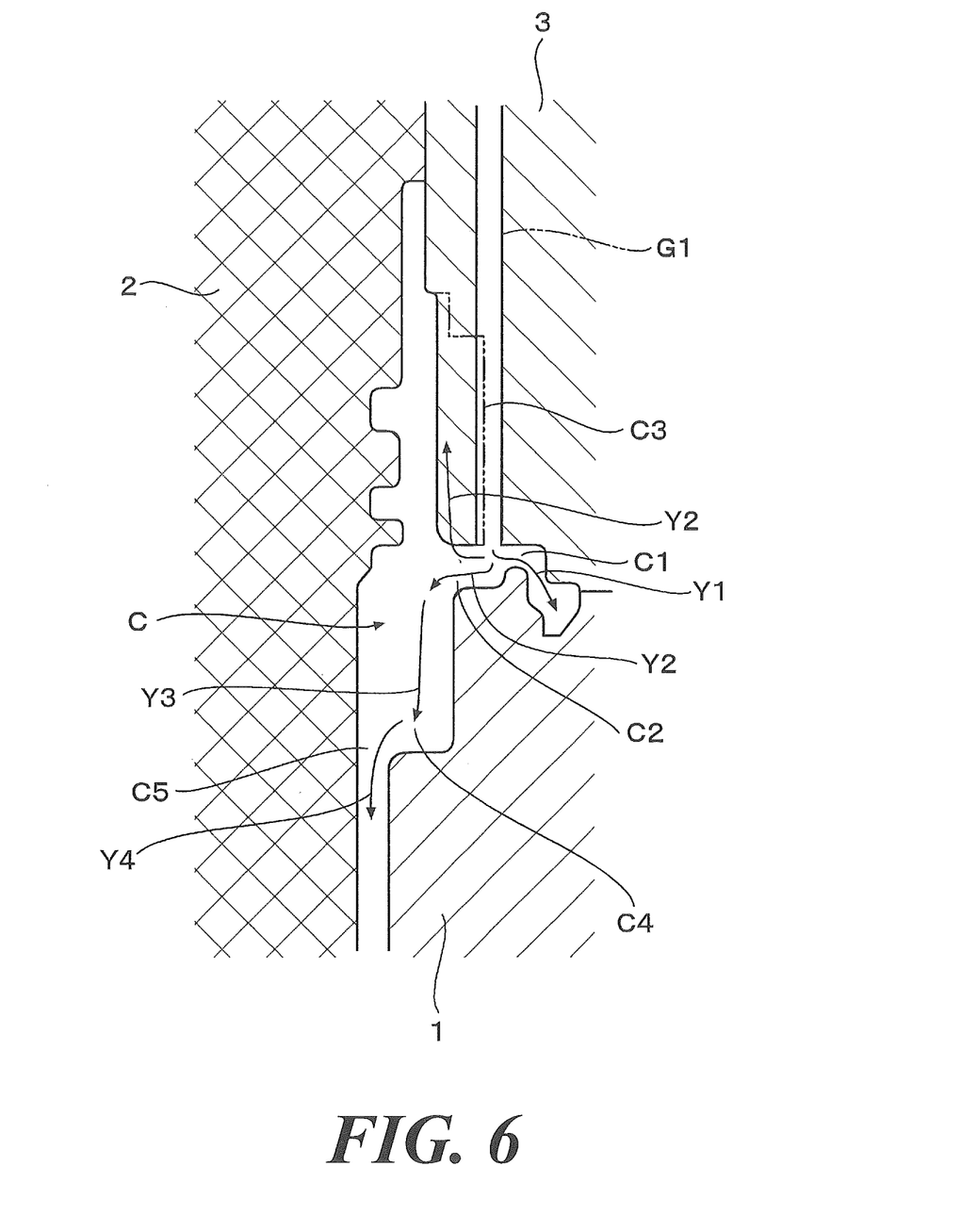
FIG. 6 is an explanatory drawing which shows cavities in a mold which are used to form the valve unit through injection molding.

An injection molding process of the housing main body 30 will be described in relation to the gate portions G As shown in FIG. 6, the housing main body 30 is molded as a result of solidification of a molten synthetic resin which is filled into a cavity C in a mold. The mold is made up of plural relatively-slidable dies 1, 2, 3 and the like.

FIG. 6 shows a main part of the cavity C used to mold the housing main body 30, and the cavity C has cavities C1 to C5. The cavity C1 is provided for the partition wall 35 and the valve seat 37a. The cavity C2 is provided below the cavity C1 for the thin ribs 45. The cavity C3 is provided above the cavity C1 for the check valve guide ribs 40. The cavity C4 is provided below the cavity C2 for the float valve guide ribs 47. The cavity C5 is provided adjacent to the cavity C4 for the circumferential wall 31. A gate G1 is provided so as to extend upwards on an upper surface side of the cavity C1 and in a position which is aligned with an inner circumferential end portion of the cavity C2. Since the cavity C3 for the check valve guide ribs is invisible on this section, the cavity C3 is indicated by a phantom line.

When injection molding the housing main body 30, a molten resin is supplied from an injection molding machine, not shown, and flows into the cavity C as follows. Namely, the molten resin which is supplied into the gate G1 firstly flows (refer to an arrow Y1) in the cavity C1 for the partition wall 35 and the valve seat 37a and then flows (refer to arrows Y2) into the cavity C2 for the thin ribs 45 and into the cavity C3 for the check valve guide ribs 40 via the cavity C1. Thereafter, the molten resin having passed through the cavity C2 flows (refer to an arrow Y3) into the cavity C4 for the float valve guide ribs 47, and the molten resin having passed through the cavity C4 further flows (refer to an arrow Y4) into the cavity C5 for the circumferential wall 31 and towards ends of the cavities for the housing main body 30. Thereafter, the molten resin having flowed into the cavity C is cooled to be solidified, and a resultant molded product is removed from the cavity C by appropriately sliding the dies 1, 2, 3 to thereby obtain the housing main body 30.

In the above-described embodiment, the gate portions G are disposed on the upper surface side of the partition wall 35 in the plural positions which coincide with the thin ribs 45 (refer to FIG. 4A). Therefore, when injection molding the housing main body 30, the molten resin supplied into the gates G1 flows smoothly through the cavity C2 for the radially-extending thin ribs 45, thereby enhancing the moldability of the housing main body 30. In particular, since the plural gate portions G are disposed at the inner circumferential end portions of the radially-extending thin ribs 45, the molten resin flows quickly radially outwards from the plural radially inward positions, thereby enhancing the moldability. As shown in FIG. 1, with respect to a centerline of the valve unit 10, radially-inward end surfaces of the thin ribs 45 are disposed more radially inward than radially-inward end surfaces of the check valve guide ribs 40.

By providing the thin ribs 45 such that the cavity C2 is aligned with the gates G1, the cavity C2 function s as the flow path of the molten resin which is supplied from the gates Gl. Therefore, the flow path of the molten resin can be enlarged by increasing the thickness and width of the thin ribs 45 so that the molten resin is easily filled in the other cavities.

In this embodiment, the upper end portions of the float valve guide ribs 47 are connected to the outer circumferential end portions of the thin ribs 45, and thus, an outer circumferential end portion of the cavity C2 for the thin ribs 45 communicate with an upper end portion of the cavity C4 for the float valve guide ribs 47. Therefore, when injection molding, the molten resin flows continuously and smoothly into the cavity C4 through the cavity C2, and the molten resin flows into the cavity C5 for the circumferential wall 31 through the cavity C4, whereby the molten resin can be supplied smoothly to the ends of the cavities for the housing main body 30, thereby enhancing the moldability of the housing main body 30.

In the valve unit 10, as shown in FIGS. 4A, 4B, the plural thin ribs which radially extend around the opening portion 37 on the lower surface side of the partition wall 35 and the plural check valve guide ribs 40 which project at even circumferential intervals on the inner circumference of the vent chamber R2 on the upper surface side of the partition wall 35 are formed alternately in the circumferential direction so as not to be superposed on each other when viewed from the axial direction of the housing main body 30. Therefore, shrink marks produced around the opening portion 37 on the upper surface side and the lower surface side of the partition wall 35 can evenly be dispersed between the upper and lower sides of the partition wall 35, thereby enhancing the roundness of the opening portion 37.

In this embodiment, as shown in FIGS. 2 and 4B, while the plural thin ribs 45 radially extend on the lower surface side of the partition wall 35, they are discontinued before the valve seat 37a so as not to reach it at the inner circumferential end portions thereof to thereby form the flat portion 46 between the thin ribs 45 and the valve seat 37a. Since the thin ribs 45 and the valve seat 37a are disconnected, the inner circumference of the opening portion 37 can be prevented from being affected by shrink marks which are produced during the cooling period after the completion of injection molding, thereby improving the roundness of the opening portion 37.

Next, the operation of the above-described valve unit 10 will be described.

The valve unit 10 is mounted on an upper wall of a fuel tank via an external case, not shown, which communicates with an evaporation fuel-piping connected to a canister. When the fuel level is so low that the float valve 70 is not submerged, the float valve 70 moves downwards, and the lower side of the opening portion 37 in the partition wall 35 is opened (refer to FIG. 2). When the pressure inside the fuel tank does not exceed a predetermined value, the upper side of the opening portion 37 is closed by the check valve 80 which is biased by the check valve spring 87 (refer to FIG. 2).

When the pressure inside the fuel tank exceeds the predetermined value in the above-described state, the check valve 80 moves upwards against the biasing force of the check vale spring 87 to open the upper side of the opening portion 37. Then, fuel vapors pass through the opening portion 37 and flows into the vent chamber R2 to be sent to the canister, whereby the pressure within the fuel tank is reduced. On the other hand, when the pressure inside the fuel tank is reduced to be lower than the atmospheric pressure, outside air is introduced into the vent chamber R2 and the valve element 83 is pressed, whereby the valve element 83 moves downwards against the biasing force of the incorporated spring 85 to open the upper through hole 81a of the casing 81. Then, outside air passes through the lower through hole 81b in the casing 81 and the opening portion 37 of the housing 20 and is introduced into the valve chamber R1 to flow into the fuel tank, whereby a negative pressure state occurring in the fuel tank is eliminated.

When the fuel level within the fuel tank rises as a result of the vehicle turning to be inclined largely whereby the float valve 70 is submerged to the predetermined height or more, the float valve 70 is caused to float by the sum of the biasing force of the float valve spring 55 and its own weight of the float valve 70 itself, and as shown in FIG. 5, the valve head 73a abuts the valve seat 37a to close the opening portion 37.

As a result, the fuel is prevented from passing through the opening portion 37 to flow into the vent chamber R2, thereby preventing the leakage of the fuel to the outside of the fuel tank.

In the valve unit 10, since the roundness of the opening portion 37 can be enhanced as described above, the sealing capability of the float valve 70 to seal the opening portion 37 when the valve head 73a abuts the valve seat 37a to close the opening portion 37 can be enhanced, thereby further surely preventing the leakage of the fuel to the outside of the fuel tank.

In this embodiment, when the float valve 70 moves upwards/downwards, the insertable portion 73 of the float valve 70 is guided by the float valve guide ribs 47, and the base portion 71 of the float valve 70 is guided by the ribs 79 which lie close to the inner circumferential surface of the lower cylindrical portion 32 of the housing 20. Therefore, the float valve 70 can move upwards without being inclined, so that the vale head 73a firmly abuts the valve seat 37a, thereby enhancing the sealing capability of the valve head 73a to seal the valve seat 37a.

Since the plural radially-extending thin ribs 45 are provided on the lower surface side of the partition wall 35, the volumetric capacity of an upper space in the valve chamber R1 can be reduced. Therefore, an amount of fuel staying between an upper surface of the float valve 70 and the partition wall 35 when the float valve 70 moves upwards can be reduced. As a result, not only can the dynamic performance of the float valve 70 be enhanced, but also the flow of fuel from the opening portion 37 into the vent chamber R2 can be prevented effectively.

DESCRIPTION OF REFERENCE NUMERALS AND CHARACTERS

10 valve unit; 20 housing; 31 circumferential wall; 35 partition wall; 37 opening portion; 37a valve seat; 40 check valve guide rib; 45 thin rib; 46 flat portion; 47 float valve guide rib; 70 float valve; 80 check valve; G gate portion; R1 valve chamber; R2 vent chamber.

The invention claimed is:
1. A valve unit, comprising:
a housing in which a lower valve chamber communicating with an interior of a fuel tank and an upper vent chamber communicating with an outside of the fuel tank are provided via a partition wall, the partition wall having an opening portion;
a float valve which is disposed in the lower valve chamber of the housing so as to move upwards/downwards; and
a check valve which is disposed within the upper vent chamber so as to move upwards/downwards,
wherein a valve seat is provided along a circumferential edge of the opening portion on a lower surface side of the partition wall, and plural radially-extending thin ribs are formed around the valve seat,
wherein check valve guide ribs which guide an upward/downward movement of the check valve extend axially while being connected to the partition wall and are provided at predetermined circumferential intervals on an inner circumference of the upper vent chamber,
wherein the thin ribs which are formed on a lower surface of the partition wall and the check valve guide ribs which are formed on the inner circumference of the upper vent chamber are formed circumferentially alternately so as not to be superposed on each other when viewed from an axial direction of the housing, wherein, with respect to a centerline of the valve unit, radially-inward end surfaces of the thin ribs are disposed more radially inward than radially-inward end surfaces of the check valve guide ribs, wherein gate portions that are used in injection molding the housing are disposed on an upper surface side of the partition wall at plural positions which coincide with the thin ribs, and wherein axially-extending float valve guide ribs which guide an upward/downward movement of the float valve are provided at predetermined circumferential intervals on an upper portion of an inner circumference of the lower valve chamber, and upper end portions of the float valve guide ribs are connected to outer circumferential end portions of the thin ribs.

2. A valve unit, comprising:

a housing in which a lower valve chamber communicating with an interior of a fuel tank and an upper vent chamber communicating with an outside of the fuel tank are provided via a partition wall, the partition wall having an opening portion;

a float valve which is disposed in the lower valve chamber of the housing so as to move upwards/downwards; and a check valve which is disposed within the upper vent chamber so as to move upwards/downwards, wherein a valve seat is provided along a circumferential edge of the opening portion on a lower surface side of the partition wall, and plural radially-extending thin ribs are formed around the valve seat, wherein check valve guide ribs which guide an upward/downward movement of the check valve extend axially while being connected to the partition wall and are provided at predetermined circumferential intervals on an inner circumference of the upper vent chamber, wherein the thin ribs which are formed on a lower surface of the partition wall and the check valve guide ribs which are formed on the inner circumference of the upper vent chamber are formed circumferentially alternately so as not to be superposed on each other when viewed from an axial direction of the housing, wherein, with respect to a centerline of the valve unit, radially-inward end surfaces of the thin ribs are disposed more radially inward than radially-inward end surfaces of the check valve guide ribs, and wherein, in a plan view from a top surface of the valve unit, each of the thin ribs is located between two adjacent ribs of the check valve guide ribs.

3. The valve unit of claim 2, wherein the thin ribs are discontinued from the valve seat so as not reach the valve seat to thereby form a non-rib portion between the thin ribs and the valve seat.

4. The valve unit of claim 2, wherein, in the plan view from the top surface of the valve unit, the thin ribs are spaced apart from the check valve guide ribs.

5. The valve unit of claim 2, further comprising:

a gate portion disposed on an upper surface side of the partition wall at a position which coincides with the thin ribs, the gate portion being configured for injection molding of the housing.

6. The valve unit of claim 2, wherein each of the check valve guide ribs includes a lower portion and an upper portion provided continuously with the lower portion, in a radial direction of the valve unit, the lower portion extending toward a center of the valve unit more than the upper portion.

7. The valve unit of claim 6, wherein, in the plan view from the top surface of the valve unit, each of the thin ribs is spaced apart from the lower portion and the upper portion of said each of the check valve guide ribs.

8. The valve unit of claim 2, wherein the check valve guide ribs include a lower portion and an upper portion provided continuously with the lower portion, in a radial direction of the valve unit, the lower portion extending toward a center of the valve unit more than the upper portion.

\* \* \* \* \*